(12) United States Patent
Uckun et al.

(10) Patent No.: US 12,085,131 B2
(45) Date of Patent: Sep. 10, 2024

(54) SYSTEM AND METHOD FOR DETERMINING DEGRADATION OF ROTATING COUPLING USING ROTATION SENSORS

(71) Applicant: Novity, Inc., San Francisco, CA (US)

(72) Inventors: Serdar Uckun, Cambridge, MA (US); Kai F. Goebel, Mountain View, CA (US)

(73) Assignee: Novity, Inc., San Carlos, CA (US)

( * ) Notice: Subject to any disclaimer, the term of this patent is extended or adjusted under 35 U.S.C. 154(b) by 862 days.

(21) Appl. No.: 17/134,696

(22) Filed: Dec. 28, 2020

(65) Prior Publication Data

US 2022/0205492 A1  Jun. 30, 2022

(51) Int. Cl.
| | | |
|---|---|---|
| *G01L 3/04* | (2006.01) | |
| *B60B 35/12* | (2006.01) | |
| *F16D 3/30* | (2006.01) | |
| *G06T 7/73* | (2017.01) | |

(52) U.S. Cl.
CPC .............. *F16D 3/30* (2013.01); *B60B 35/128* (2013.01); *G01L 3/04* (2013.01); *G06T 7/74* (2017.01); *B60B 2900/3316* (2013.01); *F16D 2300/18* (2013.01); *G06T 2207/20024* (2013.01); *G06T 2207/20084* (2013.01); *G06T 2207/30204* (2013.01)

(58) Field of Classification Search
CPC ......... F16D 3/30; F16D 2300/18; G06T 7/74; B60B 35/128; G01L 3/04
See application file for complete search history.

(56) References Cited

U.S. PATENT DOCUMENTS

| | | | | |
|---|---|---|---|---|
| 6,988,026 | B2 * | 1/2006 | Breed .................... | B60R 21/20 |
| | | | | 701/33.9 |
| 9,845,012 | B2 * | 12/2017 | Lu ........................ | B60L 3/0061 |
| 2015/0051868 | A1 * | 2/2015 | Cloninger, II ...... | G01M 13/022 |
| | | | | 702/176 |

FOREIGN PATENT DOCUMENTS

DE        102017112343 A1 * 12/2018 ............. G01L 3/109

OTHER PUBLICATIONS

Acorn Industrial Services, "12 Reasons for Coupling Failure and How to Avoid Them", Jul. 28, 2016, 7 pages.
Leugner, "Understanding Coupling Failures", MRO Magazine, Dec. 1, 2008, 5 pages.
Turbomachinery International, "Disc Coupling Failure Modes", Turbomachinerymag.com, Jan. 27, 2019, 3 pages.

* cited by examiner

*Primary Examiner* — Jamel E Williams
(74) *Attorney, Agent, or Firm* — Shun Yao; Yao Legal Services, Inc.

(57) ABSTRACT

A system and method utilize a first rotation sensor that provides a first signal indicative of a first rotation of a first end of a rotating coupling. The rotating coupling has an articulating member mechanically coupling the first end to a second end. A second rotation sensor provides a second signal indicative of a second rotation of the second end of the rotating coupling. A processor is coupled to the first and second rotation sensors and is operable to determine a relationship between the first and second rotations based on the first and second signals. Based on the relationship, the processor estimates at least one of a degradation of and a remaining useful life of the rotating coupling.

20 Claims, 5 Drawing Sheets

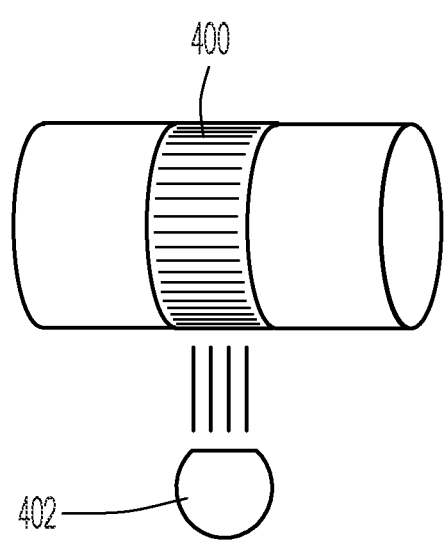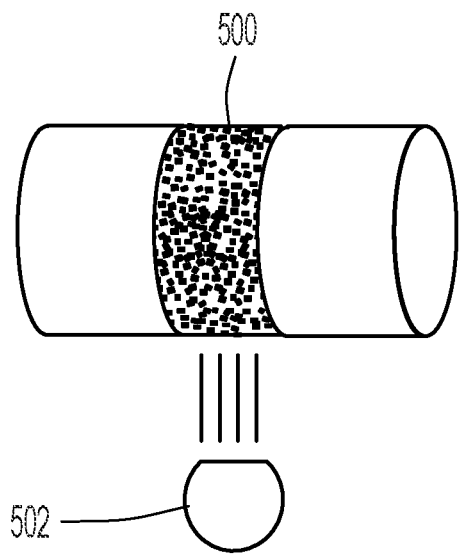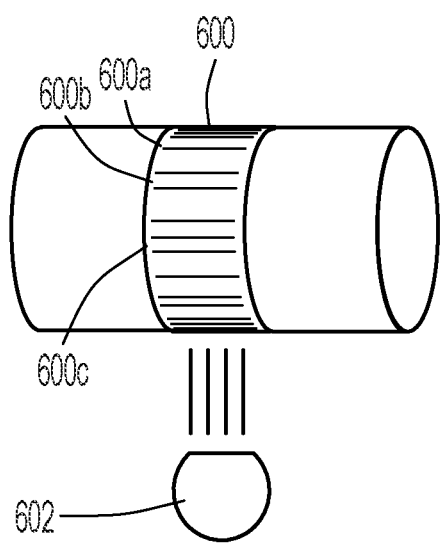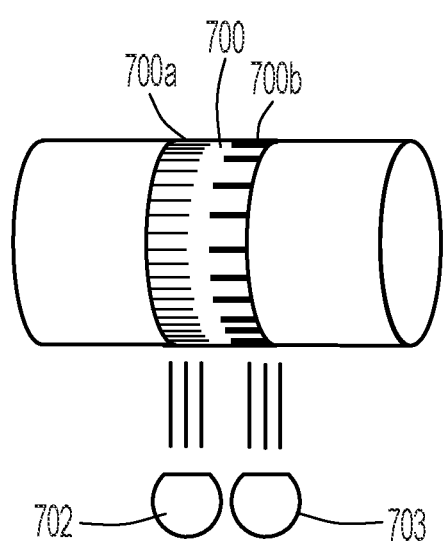
FIG. 4
FIG. 5
FIG. 6
FIG. 7

SYSTEM AND METHOD FOR DETERMINING DEGRADATION OF ROTATING COUPLING USING ROTATION SENSORS

SUMMARY

The present disclosure relates to a system and method for determining degradation of a rotating coupling using contact or non-contact rotation sensors. In one embodiment, a system and method utilize a first rotation sensor that provides a first signal indicative of a first rotation of a first end of a rotating coupling. The rotating coupling has an articulating member mechanically coupling the first end to a second end. A second rotation sensor provides a second signal indicative of a second rotation of the second end of the rotating coupling. A processor is coupled to the first and second rotation sensors and is operable to determine a relationship between the first and second rotations based on the first and second signals, and based on the relationship, to estimate at least one of a degradation of and a remaining useful life of the rotating coupling.

In another embodiment, a system and method utilize a flexible coupling having a flexible articulating member mechanically coupling a first end to a second end. First and second fiducial markers are affixed proximate the first and second ends. One or more rotation sensors provide first and second signals indicative of first and second rotations of the first and second ends based on the first and second fiducial markers. A processor is coupled to the rotation sensors and is operable to determine a relationship between the first and second rotations based on the first and second signals and based on the relationship, estimate at least one of degradation of and a remaining useful life of the flexible coupling.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 4, 5, 6, and 7 are diagrams of coupling markers according to other example embodiments;

DETAILED DESCRIPTION

The present disclosure is generally related to mechanical couplers. For example, mechanical couplers connect two rotating shafts for the transfer of rotational velocity and torque. In general, there are three categories of couplings: rigid, flexible, and special purpose. Rigid couplings connect shafts, for example, using bolted flanges, keyed sleeves or ribbed clamps bolted together over the shaft ends with keyways. Rigid couplings are often used for vertical drive systems.

Flexible couplings also connect two rotating shafts, but may be designed to perform any combination of dampening of vibration, absorbing shock loading and providing some axial movement or end float of the shafts, as well as compensating for minor misalignment. In rotating shaft applications a flexible coupling can protect the driving and driven shaft components (such as bearings) from the harmful effects of conditions such as misaligned shafts, vibration, shock loads, and thermal expansion of the shafts or other components. Elastomer (e.g., rubber) is a commonly used material for flexible coupling applications.

Special-purpose couplings include devices like mechanically flexible U-joints and constant velocity (CV) joints used for automobile applications; magnetic couplings; eddy current couplings; and fluid couplings. Like flexible couplings, these special-purpose couplings can at least compensate misalignment between two shafts, sometimes significant misalignment as in the case of U-joints and CV joints. Magnetic, eddy current and fluidic couplings may also provide some dampening and shock isolation.

Figure 1:
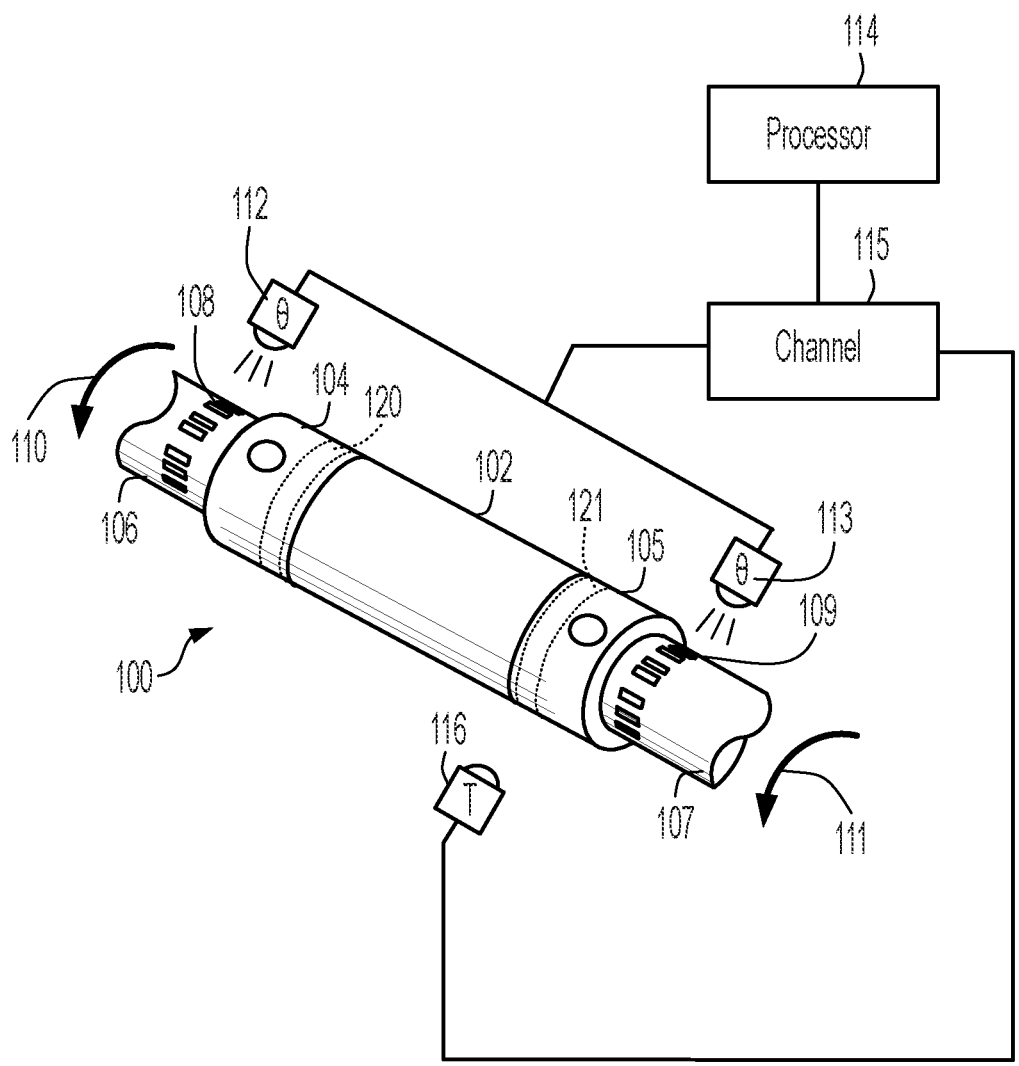
FIGS. 1, 2, and 3 are perspective views of couplings and measuring systems according to example embodiments.
Figure 3:
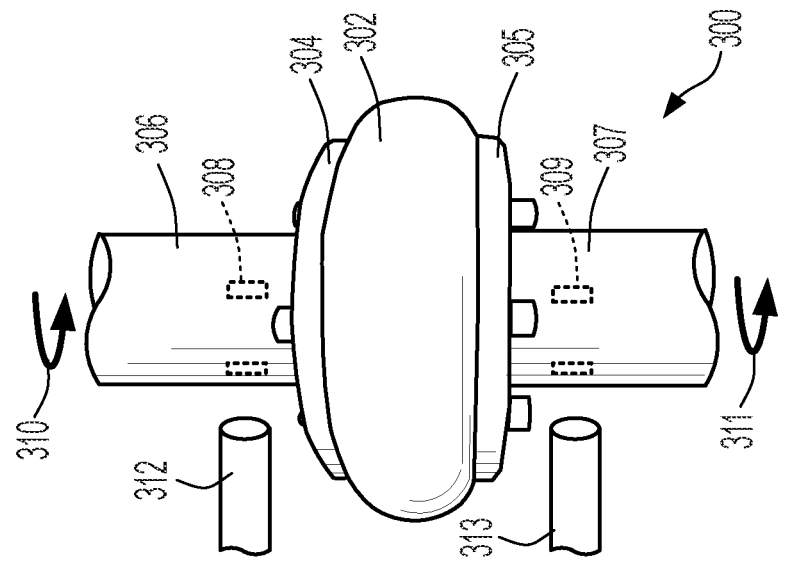
Figure 2:
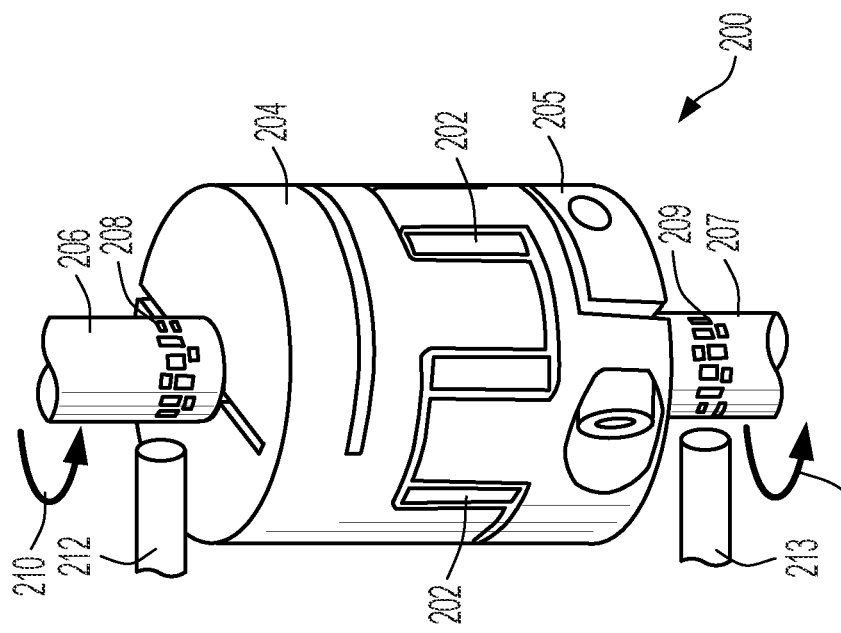

Flexible couplings are used in the industry due to their versatility since they allow for some misalignment (parallel offset or angular shaft misalignment), bending, or flexing. In FIGS. 1-3, flexible couplings are illustrated according to example embodiments. In FIG. 1, a sleeve-type coupling 100 is shown, which includes a flexible, articulating member 102 mechanically coupling a first end 104 and a second end 105. The first and second ends 104, 105 are coupled to respective rotating members, in this example shown as shafts 106, 107. The sleeve-type coupling 100 transmits rotation and torque as indicated by arrows 110, 111.

In FIG. 2, a jaw-type coupling 200 is shown, which includes a flexible, articulating member 202 mechanically coupling a first end 204 and a second end 205. The first and second ends 204, 205 are coupled to respective rotating members, in this example shown as shafts 206, 207. The jaw-type coupling 200 transmits rotation and torque as indicated by arrows 210, 211. In FIG. 3, a tire-type coupling 300 is shown, which includes a flexible, articulating member 302 mechanically coupling a first end 304 and a second end 305. The first and second ends 304, 305 are coupled to respective rotating members, in this example shown as shafts 306, 307. The sleeve-type coupling 300 transmits rotation and torque as indicated by arrows 310, 311.

In will be understood that the embodiments shown in FIGS. 1-3 are presented for purposes of illustration and not limitation. For example, the flexible, articulating members 102, 202, 302 are often made of a polymer, however other materials can be used to provide attributes such as flexing and damping, such as wire rope, springs, fluids, etc. Further, while shafts are generally shown extending from both ends of the couplings 100, 200, 300, other force transmission members could be mounted to one or both ends without using shafts, such as gears, flywheels, cams, levers, etc.

In some applications, the probability of unexpected downtime can be diminished by scheduling flexible element replacement at regular intervals. The frequency of replacement will depend upon the severity of the application and environmental conditions. A properly sized element which is stored and operated under normal conditions (i.e. under 85% humidity and 85° F.) should obtain a minimum of 6 to 8 years of service life after the date of manufacture. State of the art maintenance for these couplings is infrequent periodic visual inspection during which the condition of the flex element is evaluated for fatigue cracks originating near the stress relief grooves, discoloration and surface cracking if used in adverse conditions, such as cooling towers or severe environments (e.g., 4>pH>10).

While flexible couplings allow for some rated level of misalignment, excessive misalignment results in accelerated wear and eventual failure of the coupling. Therefore, more refined maintenance observations include checking for: noise at the coupling; powdered rubber particles or leaking lubricant directly below the coupling; process fluid and/or oil leaks at the drive, driven (or both) shafts; premature or frequent bearing or seal failure at one or both machines; broken or repeated loosening of foot bolts at one or both machines; high operating temperatures at or near the coupling; high vibration conditions, often at both machines, cracked or broken foundation, e.g., at or near the foot bolts; and high energy consumption.

Some of these symptoms may be hard to determine except by very experienced technicians. In general, it is difficult to predict when a flexible coupling will fail, or to estimate the Remaining Useful Life (RUL) of a flexible coupling by just surveying the operating conditions around the coupling. Embodiments described herein relate to methods, apparatuses, and systems that can be used to track the wear in a flexible coupling over time, and to predict when a coupling may fail under normal use conditions. This can be used for other types of couplings, e.g., rigid or special-purpose couplings, with appropriate adjustments to the algorithms to account for the different performance and modes of failure of the other types of couplings.

Embodiments described herein include a method, system, and apparatus to track the wear in a flexible coupling over time, and to predict when a coupling may fail under normal use conditions. The RUL estimation and degradation prediction method and algorithm are based on precise measurements of up to three different parameters measured using motion/rotation sensors/detectors that reflect wear and tear on the flexible coupling, and from which analysis can reveal degradation of the flexible coupling. By measuring these parameters and tracking changes of these values over time, standard prognostic methods can be used such as Unscented Kalman Filters, Particle Filters, or a variety of data-driven techniques (such as recurrent neural networks) to predict when a flexible coupling would reach the end of its useful life under specified use conditions.

The three parameters considered as part of the RUL prediction include backlash, windup, and inertia. All of these can be measured using the signals from rotation sensors, such as sensors 112 and 113 shown in FIG. 1. For example, a first rotation sensor 112 may detect rotation at one end of a rotating coupling based on marker 108 and a second rotation sensor 113 may detect rotation at the other end of the rotating coupling based on marker 109. A relation between the signals can be used to derive backlash, windup, and inertia. Another parameter that can be measured and used for RUL prediction is temperature, and this can also be measured using a sensor such as an infrared (IR) temperature sensor 116. Note that the above sensors are non-contact, detecting temperature and rotation based on optical signals. In some embodiments, contact sensors may be used, e.g., a gear, wheel, magnetometer, thermistor, thermocouples, etc. Note that the contact and non-contact temperature and rotation sensors may be combined in a single package, and a combination of contact and non-contact sensors may be used.

Note that in some embodiments, a single device may be used to produce two signals associated with the two sensors 112, 113. For example, a video camera may be used that images both markers 108, 109 in a single view. This may still be considered using two sensors, as the subset of imaging pixels that images each marker can be considered a separate sensor even though they share a common substrate. The signals of these two sensor portions may be combined in a single video signal, but an imaging algorithm would later separate the two signals out when analyzing the video frame. Such a video camera may also be configured as a temperature sensor, e.g., providing an IR image of the rotating coupling.

As noted above, an RUL prediction may involve measuring or estimating backlash, windup, and inertia. Backlash is the momentary loss of motion in a coupling. For example, when torque is applied in one direction, the coupling bends and compresses under that stress. When the direction of torque is changed, backlash is experienced within the coupling. Any amount of backlash in a motion control application could be detrimental to the application, potentially causing lack of accuracy in positioning, and difficulty in tuning the system. The amount of backlash observed in a coupling in response to changes in the direction of torque is expected to increase over time as the material ages.

The backlash can be measured via an electromagnetic or optical sensor using precise fiducial markers on the drive shaft and the driven shaft to measure the difference in angular velocity as a result of backlash. Using this method, the backlash might be measured as:

$$\frac{\Delta\emptyset}{\Delta\tau/\Delta t}$$

where $\Delta\emptyset$ refers to the momentary change in the radial alignment between the two shafts and $\Delta\tau/\Delta t$ refers to the momentary change in the torque applied to the drive shaft. The change in torque can be estimated using changes in shaft speed S and drive power P, e.g., $\Delta\tau$ (N·m)=$\Delta P$ (W)/$\Delta S$ (RPM). Drive power may be determined for example based on current and/or voltage for an electrical drive motor, and pressure changes for a hydraulic motor.

Windup is also known as torsional compliance or torsional rigidity and is present in all couplings. It is the rotational deflection between the driver and the load, similar to winding up a spring. The windup in a flexible coupling is expected to increase over time (given similar torque and rotational velocity inputs). By using the same fiducial markers on the drive and driven shafts and the same optical, electrical, or magnetic sensor to measure the phase angle between the two fiducial markers, windup of a flexible coupling can be measured and the change in windup tracked over time.

Inertia refers to the coupling's resistance to change in angular velocity and governs the tendency of the coupling to remain at a constant speed in response to application of torque. The amount of inertia observed in a coupling in response to application of torque is expected to increase over time as the material ages. By using the same fiducial markers on the drive and driven shafts and the same optical, electrical, or magnetic method to measure the phase angle between the two fiducial markers, the inertia of a flexible coupling can be measured as:

$$\frac{\Delta\emptyset}{\Delta\tau/\Delta t}.$$

This is similar to backlash measurement, except that for backlash measurements $\Delta\tau/\Delta t$ is a negative number (due to the change in direction) whereas for inertia measurements, only the magnitude of torque is changed while its direction remains constant.

In elastomeric couplings, breakdown of the torque-transmitting element often results from excessive heat, from either ambient temperatures or internal buildup in the elastomer primarily due to misalignment or other operating modes such as very frequent directional changes. Similarly, very frequent shocks can also contribute to heat buildup because the heat generated during compression is not readily dissipated during the short relaxation period.

Because elastomeric compounds such as rubber are not good heat transmitters, this "thermal hysteresis" results in a temperature increase up to the point where the elastomer may be damaged from the inside out. The strength of elastomers decreases rapidly with rising temperature. The effect may vary: while some elastomers essentially melt, others can bake dry. It is therefore beneficial to additionally measure temperature of the elastomer directly on the elastomer or on the flange that is in contact with the elastomer. Even for special-purpose rotational couplers such as U-joints and CV joints, temperature measurements can be useful, e.g., indicative of wear in the joint bearings. A contact or non-contact temperature sensor can be used to measure coupling temperature, such as sensor 116 shown in FIG. 1.

In reference again to FIG. 1, fiducial markers 108, 109 are shown on 106, 107, one of the shafts 106, 107 being a drive shaft and the other a driven shaft. Optical sensors 112, 113, detect the markers as the shafts 106, 107 are rotated as illustrated by arrows 110, 110. The sensors 112, 113, may also include an illumination source, e.g., light emitting diode (LED), laser, etc. In other embodiments, the illumination may come from ambient lighting. The sensors 112, 113 generate signals that are processed via a channel 115 (e.g., analog and digital signal conditioning circuits) and a processor 114. The temperature sensor 116 may be similarly coupled to the channel 115 and processor 114.

Any type of fiducial marking scheme may be used. The markers 108, 109 include bars or lines oriented parallel with the rotation axis of the shafts 106, 107. Block-shaped optical fiducial markers 208 and 209 are shown in FIG. 2 and magnetic fiducial markers 308, 309 are shown in FIG. 3, along with respective optical sensors 212, 213 and magnetic sensors 312, 313. Note that while the markers are shown on the drive shaft and driven shaft in these examples, the markers could be placed on the coupling ends, e.g., alternate marking locations 120, 121 shown in FIG. 1. Also note that in some embodiments, the sensors may detect the rotation without using dedicated fiducial markers. For example, a video sensor may be able to detect rotation characteristics of the rotating coupler based on its video signal, e.g., due to features already included on the coupler such as clamps, bolts, scratches, etc.

The fiducial markers may be placed at multiple angular intervals to increase angular resolution, and the size of the markers may be selected based on factors such as the rotation speed of the shafts, response time of the sensors, etc. The space between marking interval may be the same or varied, e.g., to correspond to a coded sequence, random, etc. Markers may be of the same color or different colors, same of different lengths, or same or different widths in order to facilitate measurement. Multiple markers may be used to measure the small changes in backlash that are used for monitoring purposes. For example, the markers may be spaced at angular intervals that are smaller than the expected backlash, as illustrated in the example marker 400 in FIG. 4. In a different embodiment where the distance between markers is too small to be practical, other means such as speckle patterns can be used to increase the resolution of the change detection. In FIG. 5, a diagram illustrates an example of a speckle pattern marker 500 that may be placed on a shaft and/or coupling. The markers 400, 500 shown in FIGS. 4 and 5 can be read by optical sensors 402, 502. Matching markers 400, 500 and sensors 402, 502 would be placed on another side of a coupling, e.g., as shown in FIGS. 1-3.

In FIG. 6, a shaft and/or coupling marker 600 is shown according to another example embodiment. This marker 600 includes three different marking groups 600a, 600b, 600c, which respectively include one, two and three lines. In this simplified example, a sensor 602 would detect the pattern $\{1, 2, 3, 1, 2, 3, \ldots\}$ when the shaft/coupling is turning one direction, and would detect the pattern $\{3, 2, 1, 3, 2, 1, \ldots\}$ when the shaft/coupling is turning in the opposite direction, allowing a processing system to detect changes in the direction of rotation. These groups 600a, 600b, 600c are shown for purposes of illustration, and other types of coded markings could be used in order to provide different signals in different rotation directions.

In FIG. 7, a shaft and/or coupling marker 700 is shown according to another example embodiment. This marker 700 includes two different marking groups 700a, 700b, which are at different spacing and having different thicknesses. These groups are shown being read by two different sensors 702, 703, although may be configured to be read by a single sensor, e.g., using different marker colors, illumination wavelength, polarization responses, etc. Generally, the different marking groups 700a, 700b may be selected for use based on a current operating condition, e.g., shaft speed, shaft direction, electrical noise, inability to read one set of markers, etc. Note that if both marking groups 700a, 700b are regularly read and analyzed under different conditions (e.g., the drive shaft is regularly switched between low and high speed operation), then there may be two sets of statistics collected. It should be possible to combine the different measurements to obtain a composite estimation of coupling statistics such as useful life.

Generally, markers are used in a number of systems to determine rotational speed. For example in anti-lock brake systems, wheel speed sensors are used to determine sudden changes in wheel speed to prevent lockup. The illustrated embodiments are different in that they provide a way to make very high precision measurements of the angular difference between the drive and driven axes. For example, using an optical detection method, a high-speed camera may be placed at a suitable location where it could visualize both shafts and produce two-dimensional images. A vision algorithm may be used to inspect every frame to measure the angular offset (phase angle) between the two shafts as a function of time. Other optical sensors may also be used, such as photodiodes, photovoltaic cells, etc., that produce one-dimensional output signals.

For an electromagnetic detection method, the fiducial markers can be made of a conductive material or magnetic material (e.g., permanent magnet). Magnetic sensors (e.g., Hall effect sensors) are placed proximate the markers at the drive shaft and the driven shaft. An electrical signal is obtained when the fiducial marker passes under the sensor. A comparator circuitry then measures the angular offset (phase angle) between the two shafts as a function of time. A temperature measurement can be accomplished, for example, with an infrared temperature gauge that provides temperature readings at relatively low sampling frequency of around $\frac{1}{60}$ Hz.

Figure 8:
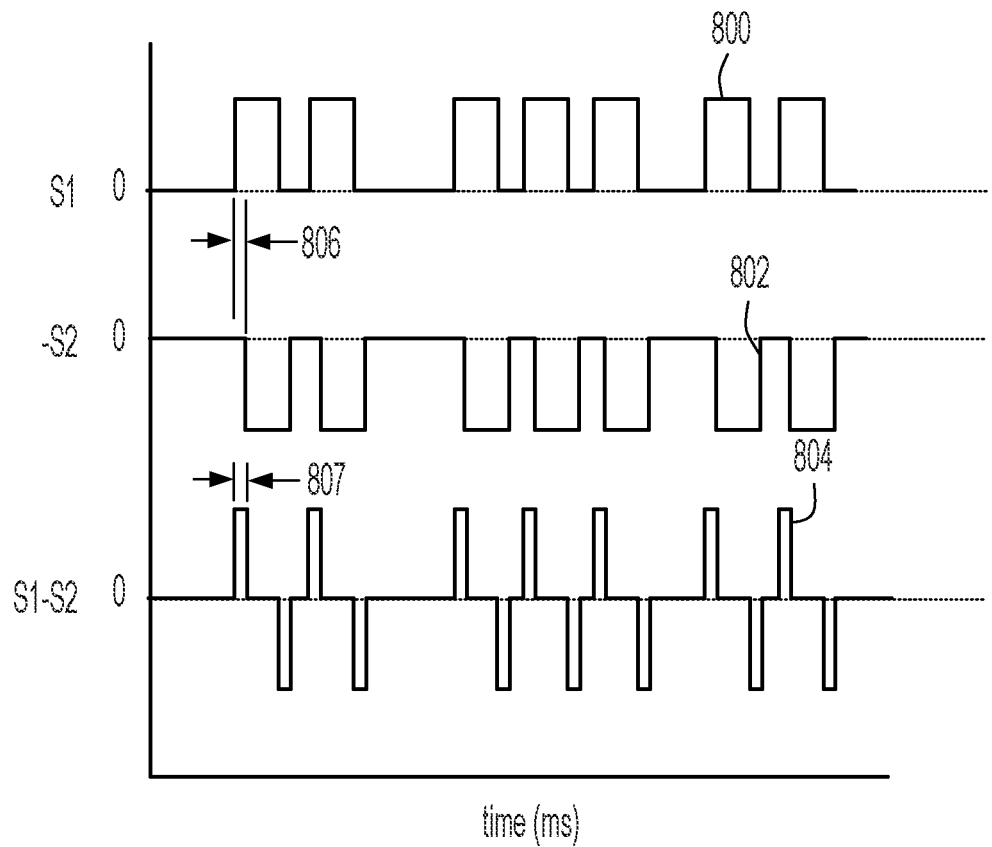
FIGS. 8 and 9 are graphs showing signals and data used by a system according to example embodiments.

In FIG. 8, a graph shows an example of signals that may be read in a system and apparatus according to an example embodiment. A first signal 800 (S1) is read by a first sensor at a first end of a rotational coupling, and a second signal 802 (S2) is read by a second sensor at a second end of the rotational coupling. Note that in this figure, the second signal 802 is shown inverted (−S2), and the inverted second signal is combined with the first signal 800 to form a difference signal 804 (S1-S2). Both signals 800, 802 are shown here as square waves that exhibit a positive voltage in response to reading an individual mark and zero volts when not reading a mark. As can be seen by the shape of the signals 800, 802, the markers are in groups with spaces therebetween, which be used to encode data within the signal, for example. However, the concepts shown here are equally applicable to uniformly spaced markers. Also note that in a practical implementation, the signals 800, 802 would exhibit artifacts such as random noise, overshoot, non-zero rise time, etc., which are not shown in these figures. However, techniques for dealing with these artifacts are well-known in the signal processing arts.

Generally, the signal 800 and signal 802 (in its non-inverted form) are nearly identical but separated by a phase shift 806, which is here measured in units of time. This can be converted to a phase angle by detecting the rotation speed of the shaft. For example, the frequency of the closely spaced peaks in 800, 802 could be used to determine the shaft speed. Note that the peak width 807 of the difference signal 804 corresponds to the magnitude of the phase shift 806. In one embodiment, the width of the phase shift 806 could be determined based on a Fourier analysis of the difference signal 804, which would exhibit a primary mode frequency that corresponds to the width of the peaks of the difference signal 804. In other embodiment, a Fourier analysis of the sensor signals 800, 802 would yield two different phase angles, and a difference between these angles would correspond to the phase shift 806.

Figure 9:
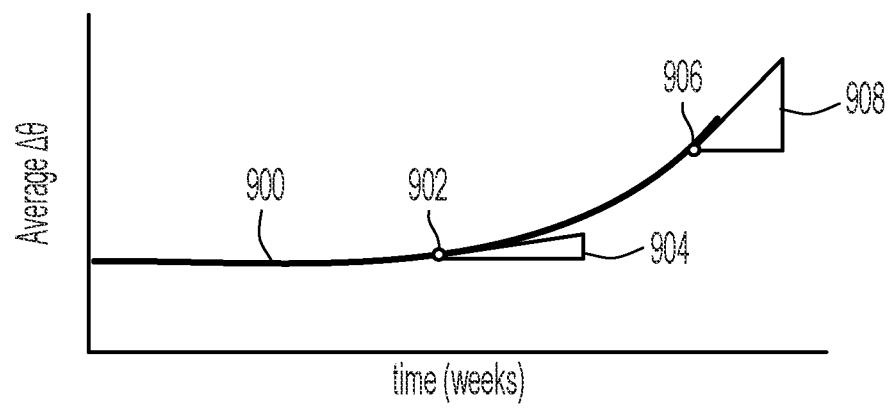

Data gathered using signals as shown in FIG. 8 can be processed, reduced, and stored to determine long-term health trends for a rotational coupler. In FIG. 9, a graph shows a simplified performance trend for a rotational coupler according to an example embodiment. In this example, a steady-state measurement of windup $\Delta\theta$, which is a difference between angles $\theta_1$, $\theta_2$ of first and second ends when under load compared to at rest. The $\Delta\theta$ under a constant load may provide a steady state estimate of windup and be measured over a long period of time (e.g., months, years) and stored in a reduced format, e.g., hourly or daily average. Note that if the load varies, the values of $\Delta\theta$ may need to be normalized, e.g., divided by the measured load. The resulting curve 900 shows a trend of increasing $\Delta\theta$ over time, which indicates the coupling is exhibiting more angular deflection under the same load. Note that in this example, the difference between angles $\theta_1$, $\theta_2$ at rest is assumed to be unchanging over time, such that the change in $\Delta\theta$ measured under constant load is indicative of windup. However, when the opportunity arises to measure the unloaded angular difference, the values in curve 900 may be updated appropriately.

In this example, a wear limit may be triggered with the windup curve 900 reaches a certain value. For a flexible coupling, this could indicate that the material has softened beyond some limit and is no longer operating within specification. In another embodiment, a rate of change of the curve 900 may be what triggers a wear limit. For example, slope 904 at point 902 may represent an acceptable rate of change over time, whereas slope 908 at point 906 may be an excessive rate of change, triggering remediation even if the absolute level of windup is still within specification.

Note that the example in FIG. 9 is simplified for purposes of illustration, and in many applications a constant load over time may not be a realistic assumption. In real-world applications, the loads on the coupler may be dynamically changing on a regular basis. Other operational parameters may change as well, including rotational speed, rotational direction, friction, angle between drive shaft and driven shaft, temperature, etc. Therefore, a more generally useful way to analyze the time series of data may be to use algorithms such as unscented Kalman filters, particle filters, recurrent neural networks, hidden Markov models, etc., to predict when a flexible coupling would reach the end of its useful life under specified use conditions.

Generally, data driven algorithms can determine outlying behavior of a current time series based the learned history of the same or analogous measurements, and can be useful in predicting failures for outlying behavior. These models may benefit from training on test data, or may be self-trained on the target system in which the sensors and markers are deployed. For example, a testbed may be used to run many couplings under accelerated aging conditions (e.g., higher than rated loads or excessive misalignment) in order to learn how the changes in windup etc. over time relate to coupling failure. Kalman filters or particle filters will use an understanding of the underlying physics of degradation that are then used to evolve the current state of health to a failure threshold which in turn could be determined by comparison of windup, backlash, and/or inertia compared to product specification and/or known material properties. For the elastomer, the underlying physics might be a phenomenon called "rubber degradation" which is driven by exposure to light, oxygen (ozone) and heat. These result in molecular changes that can significantly impact the mechanical properties, resulting for example in cracking or charring. The type of elastomer used will determine, for example, whether hardening or softening is going to happen, depending on the structure of the elastomer. These processes are known as chain hardening and chain scission. The results of these algorithms can be combined with data-driven prediction to obtain a hybrid prediction model.

Figure 10:
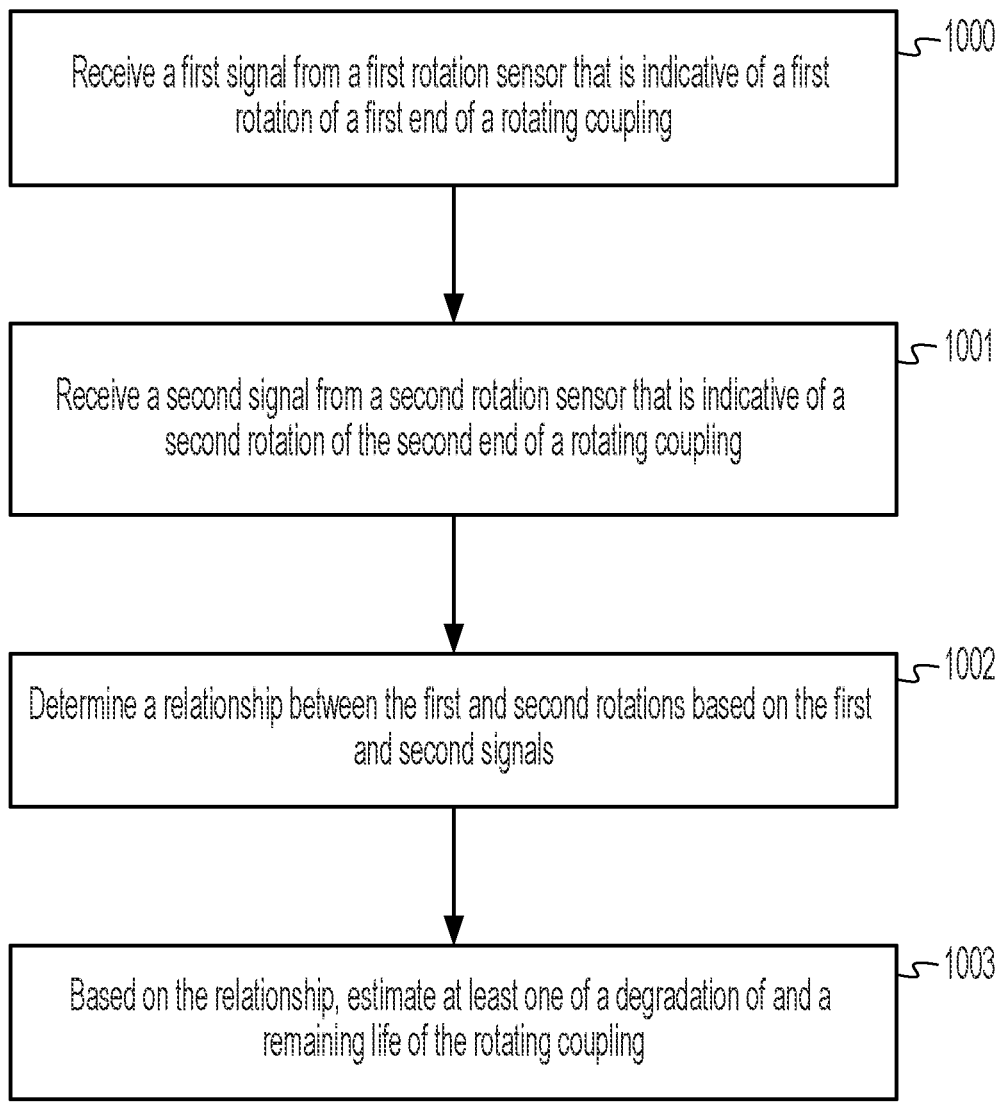
FIG. 10 is a flowchart of a method according to an example embodiment.

In FIG. 10, a flowchart illustrates a method according to an example embodiment. The method involves receiving 1000 a first signal from a first rotation sensor that is indicative of a first rotation of a first end of a rotating coupling, the rotating coupling having a articulating member mechanically coupling the first end to a second end. A second signal is received 1001 from a second rotation sensor that is indicative of a second rotation of the second end of the rotating coupling. A relationship is determined 1002 between the first and second rotations based on the first and second signals. Based on the relationship, a degradation and/or remaining useful life of the rotating coupling is estimated 1003. These estimations may be done using a variety of techniques described above, such as: 1) using machine learning to compare the behavior of the coupling to the behavior of other test articles (e.g., as measured in testbeds and/or in actual usage conditions); 2) using physics-based methods that model actual material wear and remaining life under usage conditions in order to estimate aging parameters; 3) hybrid methods that combine physics-based methods with machine learning in order to facilitate estimation of wear and remaining life.

In summary, systems and methods are described that can determine the degradation of rotational couplings (e.g., flexible couplings) by measuring sensor values and calculating parameters that reflect the state of coupling health by correlating the sensor measurements with the degree of degradation. The calculated parameters may include windup, inertia, and backlash. The sensors may be a set of optical sensors that are placed on both sides of the coupling and that record the rate of multiple markers that are affixed to the shafts. The backlash may be calculated as: $(\Delta\emptyset)/(\Delta\tau/\Delta t)$, where $\Delta\emptyset$ refers to the momentary change in the radial alignment between the two shafts and $\Delta\tau/\Delta t$ refers to the momentary change in the torque applied to the drive shaft. The windup may be calculated as the phase angle between the two fiduciary markers. The inertia may be measured as: $(\Delta\emptyset)/(\Delta\tau/\Delta t)$.

The sensors may include one or more optical sensors that can view both sides of the coupling and that record the change of a speckle pattern that is affixed to both shafts. Another parameter that can be measured is temperature, e.g., measured via an infrared sensor that measures the temperature of one of the shafts close to the coupling. The parameters changes can be tracked over time and a deviation of the parameters from a user-specified healthy state can flagged as unhealthy. The parameters may be aggregated into a composite health index through an aggregation method such as weighted sum. The parameter changes may be tracked using unscented Kalman filters, particle filters or any other algorithm that is commonly used for health estimation of industrial equipment.

The remaining life of flexible couplings may be estimated by measuring sensor values and calculating critical parameters that reflect the state of coupling health by correlating the sensor measurements with the degree of degradation, establishing a model of coupling health and by evolving the health model to a failure threshold. The remaining life of the coupling may be estimated by extrapolating the health index to a failure threshold using data-driven techniques. The data-driven technique may include a neural network with recurrent properties. The remaining life of the coupling may be estimated by extrapolating the health index to a failure threshold using physics modelling technique. The remaining life of the coupling may be estimated by extrapolating the health index to a failure threshold using a hybrid technique that uses at least some portion of physics models and some portion of data-driven techniques. Note that these techniques for RUL estimation are provided for purposes of example and not limitation. There are several methods that are established for RUL estimation, and that there is a comprehensive body of literature on the topic known to those skilled in the art of prognostics.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A system, comprising:
   a first rotation sensor that provides a first signal indicative of a first rotation of a first end of a rotating coupling, the rotating coupling having an articulating member mechanically coupling the first end to a second end;
   a second rotation sensor that provides a second signal indicative of a second rotation of the second end of the rotating coupling; and
   a processor coupled to the first and second rotation sensors and operable to:
      determine a relationship between the first and second rotations based on the first and second signals, wherein determining the relationship includes measuring one or more of windup, inertia, and backlash based on the first and second signals; and
      based on the relationship, estimate at least one of a degradation of and a remaining useful life of the rotating coupling.

2. The system of claim 1, wherein the rotating coupling comprises a flexible coupling, and wherein the articulating member comprises a flexible member.

3. The system of claim 1, wherein the backlash is calculated as $(\Delta\emptyset)/(\Delta\tau/\Delta t)$, wherein $\Delta\emptyset$ refers to a momentary change in a radial alignment between the first and second ends and $\Delta\tau/\Delta t$ refers to a momentary change in magnitude and direction of a torque applied to the rotating coupling.

4. The system of claim 3, wherein the change in magnitude and direction of the torque is estimated using changes in a shaft speed and a drive power.

5. The system of claim 1, wherein the inertia is calculated as $(\Delta\emptyset)/(\Delta\tau/\Delta t)$, wherein $\Delta\emptyset$ refers to a momentary change in a radial alignment between the first and second ends and $\Delta\tau/\Delta t$ refers to a momentary change in magnitude but not direction of a torque applied to the rotating coupling.

6. The system of claim 5, wherein the change in magnitude of the torque is estimated using changes in a shaft speed and a drive power.

7. The system of claim 1, where the windup is calculated as a phase angle between the first and second signals.

8. The system of claim 1, wherein the first and second rotation sensors comprise optical sensors that generate the first and second signals based on first and second fiducial markers affixed to the respective first and second ends.

9. The system of claim 8, wherein the fiducial markers comprise a speckle pattern.

10. The system of claim 1, further comprising a temperature sensor that measures a temperature of the rotating coupling, and wherein the degradation is further estimated based on the temperature.

11. The system of claim 10, wherein the first and second signals and the temperature are tracked over time, and wherein a deviation of the relationship and the temperature that exceeds a threshold indicates the rotating coupling is unhealthy.

12. The system of claim 11, wherein the first and second signals and the temperature are aggregated into a composite health index.

13. The system of claim 12, wherein the aggregation comprises a weighted sum.

14. The system of claim 1, wherein estimating the at least one of the degradation and the remaining useful life of the rotating coupling comprises processing the first and second signals via at least one of an unscented Kalman filter, a particle filter, or a recurrent neural network.

15. A method comprising:
receiving a first signal from a first rotation sensor that is indicative of a first rotation of a first end of a rotating coupling, the rotating coupling having an articulating member mechanically coupling the first end to a second end;
receiving a second signal from a second rotation sensor that is indicative of a second rotation of the second end of the rotating coupling;
determining a relationship between the first and second rotations based on the first and second signals, wherein determining the relationship includes measuring one or more of windup, inertia, and backlash based on the first and second signals; and
based on the relationship, estimate at least one of a degradation of and a remaining useful life of the rotating coupling.

16. The method of claim 15, wherein the rotating coupling comprises a flexible coupling, and wherein the articulating member comprises a flexible member.

17. The method of claim 15, further comprising receiving a temperature signal from a temperature sensor that measures a temperature of the rotating coupling, and wherein the degradation is further estimated based on the temperature signal.

18. A system, comprising:
a flexible coupling having a flexible articulating member mechanically coupling a first end to a second end;
first and second fiducial markers affixed proximate the first and second ends;
one or more rotation sensors that provide first and second signals indicative of first and second rotations of the first and second ends based on the first and second fiducial markers; and
a processor coupled to the rotation sensors and operable to:
determine a relationship between the first and second rotations based on the first and second signals, wherein determining the relationship includes measuring one or more of windup, inertia, and backlash based on the first and second signals; and
based on the relationship, estimate at least one of a degradation of and a remaining useful life of the flexible coupling.

19. The system of claim 18, wherein the one or more rotation sensors comprises a single video camera.

20. The system of claim 18, further comprising a temperature sensor that measures a temperature of the rotating coupling, and wherein the degradation is further estimated based on the temperature.

* * * * *